United States Patent
Shemer et al.

(10) Patent No.: US 10,120,787 B1
(45) Date of Patent: Nov. 6, 2018

(54) AUTOMATED CODE TESTING IN A TWO-DIMENSIONAL TEST PLANE UTILIZING MULTIPLE DATA VERSIONS FROM A COPY DATA MANAGER

(71) Applicant: EMC IP Holding Company LLC, Hopkinton, MA (US)

(72) Inventors: Jehuda Shemer, Kfar Saba (IL); Amit Lieberman, Kfar Saba (IL); Kfir Wolfson, Beer Sheva (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 48 days.

(21) Appl. No.: 15/393,598

(22) Filed: Dec. 29, 2016

(51) Int. Cl.
*G06F 11/36* (2006.01)
*G06F 8/71* (2018.01)

(52) U.S. Cl.
CPC ............ *G06F 11/3688* (2013.01); *G06F 8/71* (2013.01); *G06F 11/3676* (2013.01)

(58) Field of Classification Search
CPC .... G06F 11/3664–11/3696; G06F 8/70; G06F 8/71
USPC ................................. 717/120, 122, 124, 125
See application file for complete search history.

(56) References Cited

U.S. PATENT DOCUMENTS

| | | | | |
|---|---|---|---|---|
| 6,772,083 | B2 * | 8/2004 | Muller | G06F 11/3664 702/123 |
| 8,561,036 | B1 * | 10/2013 | Beans | G06F 11/368 717/124 |
| 8,826,068 | B2 * | 9/2014 | Somendra | G06F 11/3688 714/15 |
| 9,411,710 | B2 * | 8/2016 | Kumar | G06F 11/3676 |
| 2003/0093716 | A1 * | 5/2003 | Farchi | G06F 11/3676 714/34 |

(Continued)

OTHER PUBLICATIONS

Zaidman, A., et al., Studying the co-evolution of production and test code in open source and industrial developer test processes through repository mining, Empirical Software Engineering, Jun. 2011, vol. 16, Issue 3, pp. 325-364, [retrieved on Sep. 18, 2018], Retrieved from the Internet: <URL:https://link.springer.com.*

(Continued)

*Primary Examiner* — Geoffrey R St Leger
(74) *Attorney, Agent, or Firm* — Ryan, Mason & Lewis, LLP

(57) ABSTRACT

An apparatus in one embodiment comprises at least one processing platform including a plurality of processing devices. The processing platform implements compute services for users and further comprises a copy data manager configured to maintain a data version repository. The data version repository stores under the control of the copy data manager a plurality of data versions for each of one or more of the compute services implemented by the processing platform. A code version repository stores a plurality of code versions for each of one or more of the compute services implemented by the processing platform. The code versions stored in the code version repository and the data versions stored in the data version repository collectively provide a two-dimensional test plane. Automated testing the code versions is carried out by an automated code testing system using multiple distinct ones of the data versions selected from the two-dimensional test plane.

20 Claims, 5 Drawing Sheets

(56) References Cited

U.S. PATENT DOCUMENTS

| | | | | |
|---|---|---|---|---|
| 2004/0044494 A1* | 3/2004 | Muller | ................ | G06F 11/3664 |
| | | | | 702/123 |
| 2006/0230083 A1* | 10/2006 | Allyn | ................... | G06F 11/3684 |
| 2009/0164941 A1* | 6/2009 | Johnson | ............. | G06F 11/3684 |
| | | | | 715/810 |
| 2011/0154292 A1* | 6/2011 | John | ..................... | G06F 11/368 |
| | | | | 717/124 |
| 2012/0054551 A1* | 3/2012 | Gao | ................... | G06F 11/3664 |
| | | | | 714/38.1 |
| 2013/0132774 A1* | 5/2013 | Somendra | ........... | G06F 11/3688 |
| | | | | 714/32 |
| 2015/0199247 A1* | 7/2015 | Sangani | ............... | G06F 11/3672 |
| | | | | 714/46 |
| 2015/0286556 A1* | 10/2015 | Ellis | .................... | G06F 11/3684 |
| | | | | 717/125 |
| 2016/0034382 A1* | 2/2016 | Kumar | ................ | G06F 11/3676 |
| | | | | 717/124 |
| 2016/0179509 A1* | 6/2016 | Raghavan | ................. | G06F 8/71 |
| | | | | 717/121 |
| 2016/0217061 A1* | 7/2016 | Fulton | ................ | G06F 11/3688 |
| 2017/0262361 A1* | 9/2017 | Francis | ............... | G06F 11/3688 |

OTHER PUBLICATIONS

Li, Y., et al., Selecting Test Cases for Result Inspection to Support Effective Fault Localization, Journal of Computing Science and Engineering, vol. 9, No. 3, Sep. 2015, pp. 142-154, [retrieved on Sep. 18, 2018], Retrieved from the Internet: <URL:http://jcse.kiise.org/files/V9N3-03.pdf>.*

U.S. Appl. No. 14/978,351 filed in the name of A. Natanzon et al. filed Dec. 22, 2015 and entitled "Storing Application Data as an Enhanced Copy."

* cited by examiner

AUTOMATED CODE TESTING IN A TWO-DIMENSIONAL TEST PLANE UTILIZING MULTIPLE DATA VERSIONS FROM A COPY DATA MANAGER

FIELD

The field relates generally to information processing systems, and more particularly to code testing in information processing systems.

BACKGROUND

A wide variety of different techniques for testing software code are known. These conventional code testing techniques have significant drawbacks, particularly when utilized to test application code for applications executed in virtual machines, containers and other compute resources of cloud infrastructure. For example, the application code is typically tested using prefabricated or otherwise static test data. Such an arrangement is problematic in that various bugs, weaknesses or other types of failures in the application code may not be exposed until after the application code is deployed and executed in the cloud infrastructure using dynamically-varying data.

SUMMARY

In one embodiment, an apparatus comprises at least one processing platform including a plurality of processing devices. In this embodiment, the processing platform implements compute services for users and further comprises a copy data manager configured to maintain a data version repository. The data version repository is configured to store under the control of the copy data manager a plurality of data versions for each of one or more of the compute services implemented by the processing platform. Also associated with processing platform is a code version repository that is configured to store a plurality of code versions for each of one or more of the compute services implemented by the processing platform. The code versions stored in the code version repository and the data versions stored in the data version repository collectively provide a two-dimensional test plane. Automated testing of at least one of the code versions is carried out by an automated code testing system using multiple distinct ones of the data versions selected from the two-dimensional test plane.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary information processing systems and associated computers, servers, storage devices and other processing devices. It is to be appreciated, however, that embodiments of the disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. In many embodiments, an information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Some illustrative embodiments of the present disclosure provide information processing systems that implement automated code testing in a two-dimensional test plane utilizing multiple data versions from a copy data manager. For example, in some embodiments, the multiple data versions provided by the copy data manager for a given compute service include combinations of point-in-time backup or replication copies of application data utilized by that compute service as well as instances of live application data utilized by that compute service. In certain embodiments, such arrangements illustratively implement what is referred to herein as "continuous data refresh" or CDR for improved automated testing of one or more code versions of applications executed by the given compute service.

In many embodiments, compute services are provided for users under a platform-as-a-service (PaaS) model, although it is to be appreciated that numerous other cloud infrastructure arrangements could be used.

Advantageously, one or more embodiments provide significantly improved test coverage for multiple code versions of one or more applications executed as respective compute services in cloud infrastructure. As a result, in certain embodiments, application code can be made more robust to failures that might otherwise occur when code versions are executed using data versions that differ from static test data.

Figure 1:
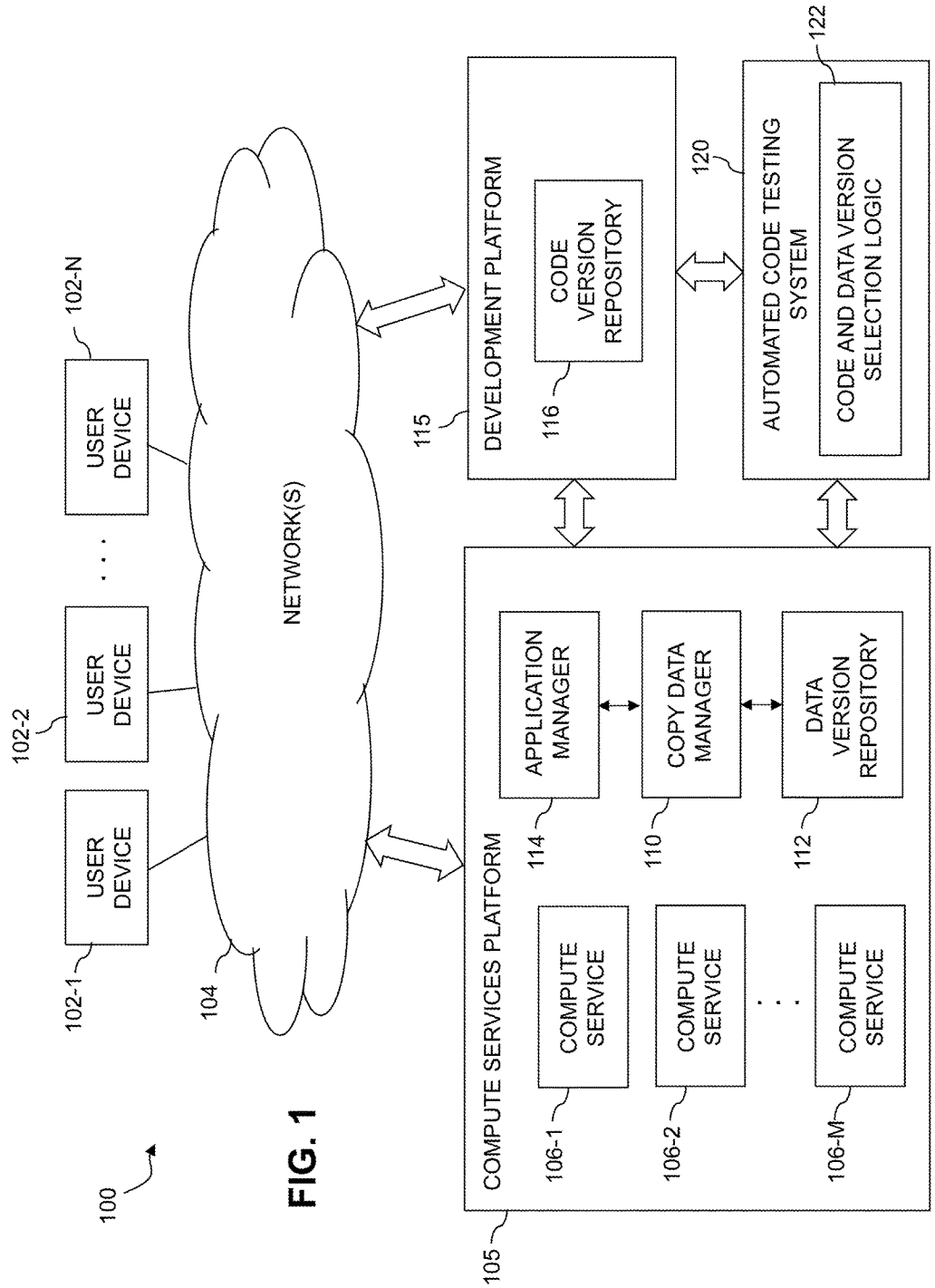
FIG. 1 is a block diagram of an information processing system implementing automated code testing utilizing multiple data versions from a copy data manager in an illustrative embodiment of the present disclosure.

The example embodiment of FIG. 1 shows an information processing system 100 configured in accordance with an illustrative embodiment of the present disclosure. The information processing system 100 comprises user devices 102-1, 102-2, ... 102-N. The user devices 102 communicate over a network 104 with a compute services platform 105.

The user devices 102 can comprise, for example, desktop, laptop or tablet computers, mobile telephones, or other types of processing devices capable of communicating with the compute services platform 105 over the network 104.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring again to FIG. 1, the compute services platform 105 in some embodiments may be implemented as part of cloud infrastructure in the form of a cloud-based system such as an Amazon Web Services (AWS) system. Other examples of cloud-based systems that can be used to provide at least portions of the compute services platform 105 and possibly other portions of system 100 include Google Cloud Platform (GCP) and Microsoft Azure.

The compute services platform 105 in the embodiment of FIG. 1 illustratively implements compute services 106-1, 106-2, . . . 106-M on behalf of respective cloud infrastructure tenants each corresponding to one or more users associated with respective ones of the user devices 102. The variables N and M are arbitrary positive integers greater than or equal to one. The compute services 106 are assumed to include execution of one or more applications on behalf of each of one or more users associated with respective user devices 102. A given such application illustratively includes one or more code versions and one or more data versions. The data versions include application data utilized in execution of the corresponding application within a given one of the compute services 106.

The "users" in this embodiment may refer, for example, to respective ones of the user devices 102, although the term "user" as utilized herein is intended to be broadly construed so as to encompass numerous other arrangements of human, hardware, software or firmware entities, as well as combinations of such entities.

As indicated above, the compute services 106 in some embodiments are provided to users in accordance with a PaaS model, although compute services can be provided using other techniques in other embodiments.

The compute services platform 105 in the embodiment of FIG. 1 and other processing platforms referred to herein are assumed to be implemented using one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The compute services platform 105 in the FIG. 1 embodiment further comprises a copy data manager 110 configured to maintain a data version repository 112. The copy data manager 110 also interacts with an application manager 114. The application manager 114 controls execution of applications as part of the compute services 106. The application manager 114 illustratively receives application code from a development platform 115 that includes a code version repository 116. It should be noted that "receives" in this context is intended to be broadly construed so as to encompass, for example, push arrangements, pull arrangements or other techniques that allow the application manager 114 to obtain application code from the code version repository 116.

The data version repository 112 is configured to store under the control of the copy data manager 110 a plurality of data versions for each of one or more of the compute services 106 implemented by the compute services platform 105.

The data versions stored for a particular one of the compute services 106 in some embodiments include data versions associated with respective distinct database schema of one or more databases utilized by that compute service.

The code version repository 116 is configured to store a plurality of code versions for each of one or more of the compute services 106 implemented by the compute services platform 105. The code versions are illustratively associated with respective applications for which execution is controlled by the application manager 114. In some embodiments, the code version repository 116 comprises a code version control repository associated with a code development system. An example of a code version control repository that may be used in some embodiments is the "git" version control repository. Alternatively, in other embodiments, the code version repository 116 can be implemented within the compute services platform 105.

In the FIG. 1 embodiment, the code versions stored in the code version repository 116 and the data versions stored in the data version repository 112 collectively provide a two-dimensional test plane utilized by an automated code testing system 120 to test one or more of the code versions. More particularly, automated testing of at least one of the code versions is carried out by the automated code testing system 120 using multiple distinct ones of the data versions selected from the two-dimensional test plane. An example of a two-dimensional test plane of this type will be described in more detail below in conjunction with FIG. 3. The automated code testing system 120 selects particular code and data versions for testing from respective corresponding points in the two-dimensional test plane. This functionality is implemented by code and data version selection logic 122 of the automated code testing system 120.

Illustrative embodiments implementing the above-described selection of particular code and data versions from respective corresponding points in a two-dimensional test plane may be viewed as providing at least portions of the previously-mentioned "continuous data refresh" or CDR functionality for improved automated testing of one or more code versions of applications executed by the given compute service.

In some embodiments, the compute services platform 105, the development platform 115 and the automated code testing system 120 are implemented on respective distinct processing platforms. Numerous other arrangements are possible. For example, in some embodiments at least portions of at least one of the development platform 115 and the automated code testing system 120 are also implemented on the compute services platform 105.

In the FIG. 1 embodiment, the data version and code version repositories 112 and 116 are assumed to be implemented utilizing one or more storage systems of their corresponding processing platform(s).

Such storage systems can comprise any of a variety of different types of storage including network-attached storage (NAS), storage area networks (SANs), direct-attached storage (DAS) and distributed DAS, as well as combinations of these and other storage types, including software-defined storage.

In some embodiments, the data version repository 112 is more particularly implemented utilizing a Data Domain® system from Dell EMC of Hopkinton, Mass. A Data Domain® system provides secondary storage optimized as a backup target for multiple copies, and is therefore well suited for use as data version repository 112.

Other particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

The term "processing platform" as used herein is intended to be broadly construed so as to encompass, by way of illustration and without limitation, multiple sets of processing devices and associated storage systems that are configured to communicate over one or more networks. For example, distributed implementations of the compute services platform 105 are possible, in which certain components of the platform reside in one data center in a first geographic location while other components of the platform reside in one or more other data centers in one or more other geographic locations that are potentially remote from the first geographic location. Thus, it is possible in some implementations of the system 100 for the data version repository 112 to reside in a different data center than the copy data manager 110 and other platform components. Numerous other distributed implementations of the compute services platform 105 are possible. One or both of the development platform 115 and the automated code testing system 120 can also be implemented in a distributed manner.

The copy data manager 110 in the FIG. 1 embodiment is configured to control storage of at least a subset of the data versions for a given one of the compute services 106 in the data version repository 112 as respective point-in-time backup or replication copies of application data utilized by that compute service. Additionally or alternatively, the copy data manager 110 is configured to control storage of at least a subset of the data versions for a given one of the compute services 106 in the data version repository as respective instances of live application data utilized by that compute service.

In some embodiments, one or more of the data versions comprise respective metacopies of data utilized by a corresponding one of the compute services 106. A metacopy illustratively comprises a copy of one or more copies.

The copy data manager 110 in the FIG. 1 embodiment is assumed to be fully integrated with the compute services functionality of the compute services platform 105. More particularly, the copy data manager performs copy management functions such as backup and restore for the application data utilized by the compute services 106. These functions of the copy data manager 110 are illustratively orchestrated in conjunction with orchestration of the compute services 106 by the application manager 114.

For example, illustrative embodiments can utilize copy data management functionality of the type disclosed in U.S. patent application Ser. No. 14/978,351, filed Dec. 22, 2015 and entitled "Storing Application Data as an Enhanced Copy," which is incorporated by reference herein.

The automated code testing system 120 in the FIG. 1 embodiment traverses a path through at least a portion of the two-dimensional test plane. For each of a plurality of points in the path, the automated code testing system 120 tests a corresponding one of the code versions utilizing a corresponding one of the data versions.

The path illustratively comprises a plurality of points for testing a single one of the code versions using respective multiple ones of the data versions, or a plurality of points for testing respective multiple ones of the code versions using a single one of the data versions. It is also possible for the path to comprise a plurality of test points for testing respective multiple ones of the code versions using respective multiple ones of the data versions.

In some embodiments, the code and data version selection logic 122 of the automated code testing system 120 is implemented in the form of an automated quality assurance software "bot" that is configured for automatic selection of the points of the path through at least a portion of the two-dimensional test plane.

For example, the code and data version selection logic 122 is configured to select at least a subset of the plurality of points utilizing at least one of random selection, arbitrary selection, round-robin selection, revenue-based selection and issue-based selection. Examples of the latter type of selection include selection based on customer, application, deployment, bug fix history or other factors.

The code and data version selection logic 122 therefore implements a strategy for selection between multiple code versions and multiple data versions for testing a given application executed by one of the compute services 106.

In some embodiments, the copy data manager 110 is configured to transfer the data versions selected from the two-dimensional test plane from the data version repository 112 to the automated code testing system 120. The automated code testing system 120 illustratively retrieves the code versions from the code version repository 116.

Although illustratively shown as a separate component in this embodiment, the automated code testing system 120 in other embodiments can be implemented at least in part within the compute services platform 105 or within another system component such as the development platform 115.

It is to be appreciated that these and other features of illustrative embodiments are presented by way of example only, and should not be construed as limiting in any way.

Accordingly, different numbers, types and arrangements of system components such as compute services 106, copy data manager 110, application manager 114, data version and code version repositories 112 and 116, and automated code testing system 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the example embodiment of FIG. 2. The process as shown includes steps 200 through 206, and is suitable for use in the system 100 but is more generally applicable to other types of systems comprising a compute services platform, a copy data manager and an automated code testing system.

In step 200, compute services are implemented for users of an information processing system. Such compute services can illustratively comprise PaaS compute services that involve execution of applications on behalf of users. Numerous other types of compute services can be implemented in other embodiments.

In step 202, multiple data versions are stored for each of one or more of the compute services. As indicated previously, the data versions for a given one of the compute services illustratively comprise respective point-in-time backup or replication copies of application data utilized by that compute service. Other ones of the data versions for the given compute service comprise respective instances of live application data utilized by that compute service. Accordingly, in some embodiments, one or more of the data versions utilized in automated testing of code versions may comprise respective sets of live application data associated with an executing application of a given one of the compute services. These and other types of application data can be included in a given set of data versions stored in a data version repository under the control of a copy data manager.

In step 204, multiple code versions are stored for each of one or more of the compute services. The code versions in some embodiments are obtained from a code version control repository associated with a development platform or other type of code development system. Additionally or alternatively, the code versions can be maintained in a code version repository of a compute services platform or automated code testing system.

Although steps 202 and 204 are shown in the figure as being performed serially, this is for simplicity of illustration only, and in other embodiments these steps can be performed concurrently and substantially continuously within a given information processing system.

In step 206, at least one of the code versions is automatically tested using multiple distinct ones of the data versions selected from a two-dimensional test plane collectively provided by the code versions and the data versions.

For example, multiple code versions can be tested in some embodiments by traversing a path through at least a portion of the two-dimensional test plane. For each of a plurality of points in the path, a corresponding one of the code versions is tested utilizing a corresponding one of the data versions.

Figure 3:
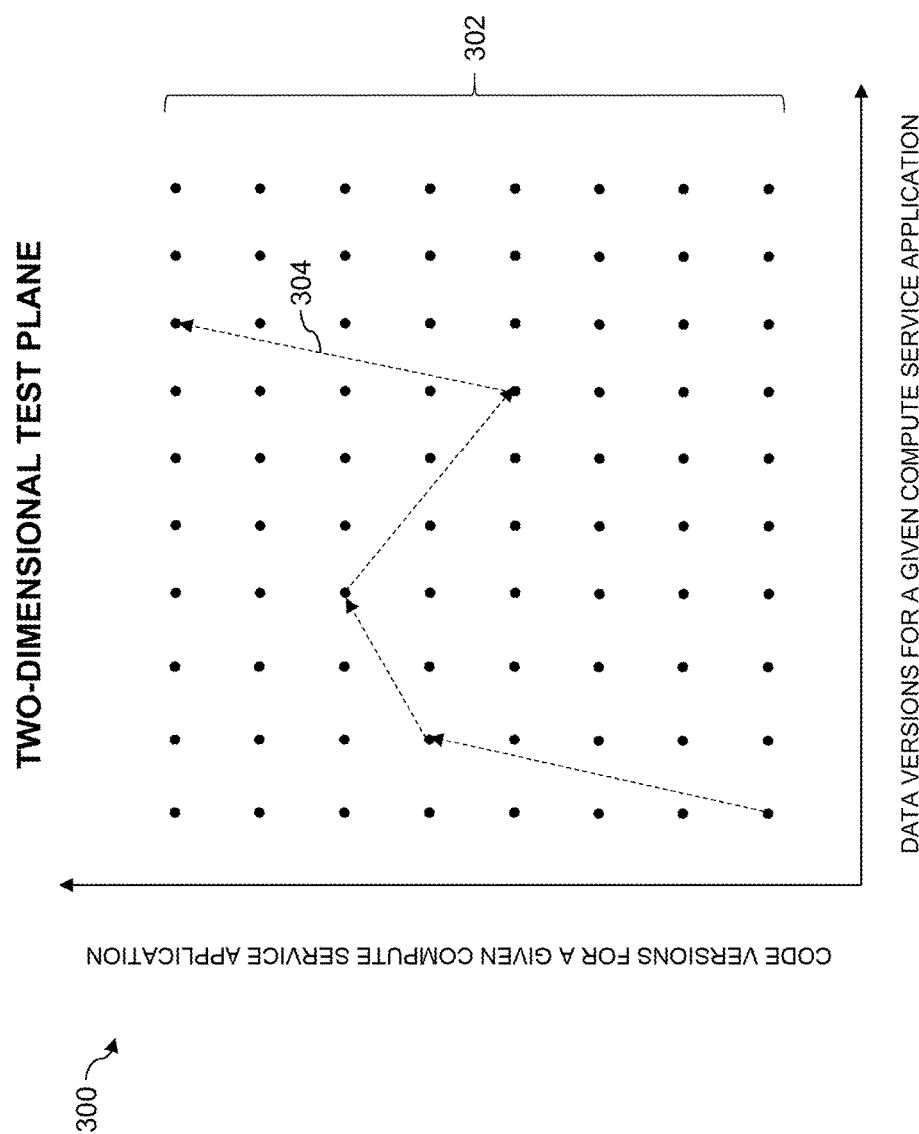
FIG. 3 shows an example of a two-dimensional test plane utilized in automated code testing utilizing multiple data versions in an illustrative embodiment of the present disclosure.

An example of a two-dimensional test plane 300 utilized in automated code testing utilizing multiple data versions is shown in the illustrative embodiment of FIG. 3. In this example, a first axis of the two-dimensional test plane 300 corresponds to a plurality of distinct code versions for a given compute service application, and a second axis of the two-dimensional test plane 300 corresponds to a plurality of distinct data versions for the given compute service application.

The two-dimensional test plane 300 is collectively provided by the code versions of the first axis and the data versions of the second axis. More particularly, the two-dimensional test plane 300 in this example comprises an array of points 302 each corresponding to an intersection of a particular one of the code versions and a particular one of the data versions.

The automated testing of step 206 may comprise, for example, traversing a path 304 through at least a portion of the two-dimensional test plane 300. For each of the points on the path 304, a corresponding one of the code versions is tested utilizing a corresponding one of the data versions.

It is to be appreciated that the term "two-dimensional test plane" as used herein is intended to be broadly construed and therefore should not be viewed as being limited to test planes associated with a two-dimensional test space. For example, a two-dimensional test plane in other embodiments can comprise any two dimensions selected from a test space having more than two dimensions. Accordingly, references herein to utilization of two-dimensional test planes in some illustrative embodiments does not preclude the presence of higher dimensional test spaces in those embodiments.

Numerous other automated testing arrangements are possible. For example, an alternative path can include a plurality of points for testing a single one of the code versions using respective multiple ones of the data versions. Such an arrangement would correspond to a horizontal path in the context of the FIG. 3 example. Another alternative path can include a plurality of points for testing respective multiple ones of the code versions using a single one of the data versions. Such an arrangement would correspond to a vertical path in the context of the FIG. 3 example. Various other automated test paths can include multiple distinct horizontal or vertical segments for each of which a particular code version or data version is tested using several data versions or several code versions, respectively.

As indicated previously, some embodiments can configure an automated testing system to implement an automated quality assurance software bot that selects the points of the path through at least a portion of the two-dimensional test plane. Such a software bot can be used to determine the particular path 304 in the context of the FIG. 3 example. The software bot in the FIG. 1 embodiment is illustratively part of the code and data version selection logic 122 of the automated code testing system 120. Also as noted above, examples of selection techniques that may be applied by the software bot or other instantiation of the code and data version selection logic 122 include random selection, arbitrary selection, round-robin selection, revenue-based selection and issue-based selection.

Terms such as "automated testing" and "automated code testing system" are intended to be broadly construed so as to encompass a wide variety of arrangements in which code and data versions are selected for use in testing utilizing automated code and version selection logic implemented under processor control.

In some embodiments, the compute services platform is fully integrated with the copy data management functionality of a copy data manager. Accordingly, data transfer capabilities of the copy data manager can be used to move data versions from a data version repository to an automated code testing system. Additionally or alternatively, the automated code testing system can be implemented at least in part within the compute services platform with the platform retrieving code versions of a code version repository for testing with data versions already present in a data version repository of that platform.

Figure 2:
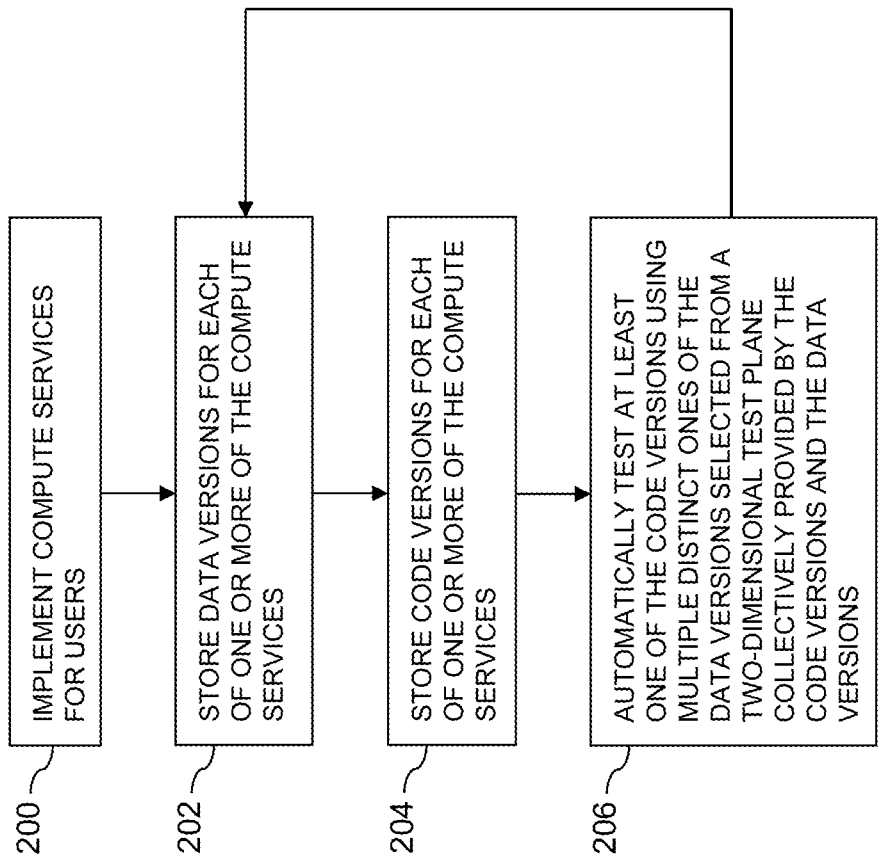
FIG. 2 is a flow diagram of a process for automated code testing utilizing multiple data versions in an illustrative embodiment of the present disclosure.

Steps 202, 204 and 206 of the FIG. 2 process can be repeatedly iterated as needed, as indicated by the feedback arrow from step 206 to step 202 in the figure.

It is to be appreciated that the FIG. 2 process can be adapted for use with other types of information systems, including by way of example an information processing system in which compute services, copy data management and automated code testing are all implemented on the same processing platform.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving compute services, copy data management and automated code testing. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated test instances within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It should be understood that the particular information processing system arrangements illustrated in FIGS. 1 through 3 are presented by way of illustrative example only, and should not be construed as limiting in any way. Numerous alternative configurations of system and device elements and associated processing operations can be used in other embodiments.

In these and other embodiments, compute services can be offered to cloud infrastructure tenants or other system users as a PaaS offering, although numerous alternative arrangements are possible.

Illustrative embodiments disclosed herein can provide a number of significant advantages relative to conventional arrangements.

For example, one or more embodiments provide significantly improved test coverage for multiple code versions of one or more applications executed as respective compute services in cloud infrastructure. As a result, application code can be made more robust to failures that might otherwise occur when code versions are executed using data versions that differ from static test data.

In some embodiments, copy data management functionality is integrated with compute services in a processing platform in a manner that facilitates testing of multiple code versions of compute services applications using actual point-in-time backup or replication copies of application data as well as instances of live application data.

Moreover, code version testing in some embodiments is fully automated, possibly utilizing a quality assurance software bot or other code and data version selection logic to determine an appropriate traversal of a two-dimensional test plane.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute services 106, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a compute services platform, a development platform and an automated code testing system in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
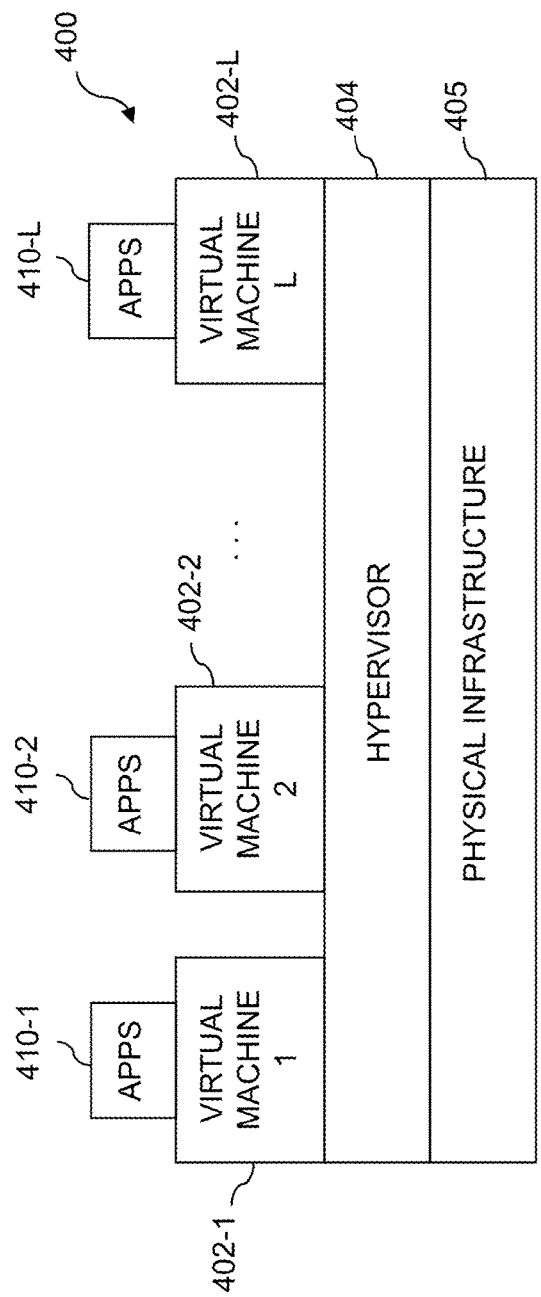
FIGS. 4 and 5 show examples of processing platforms that may be utilized to implement at least a portion of an information processing system in illustrative embodiments of the present disclosure.
Figure 5:
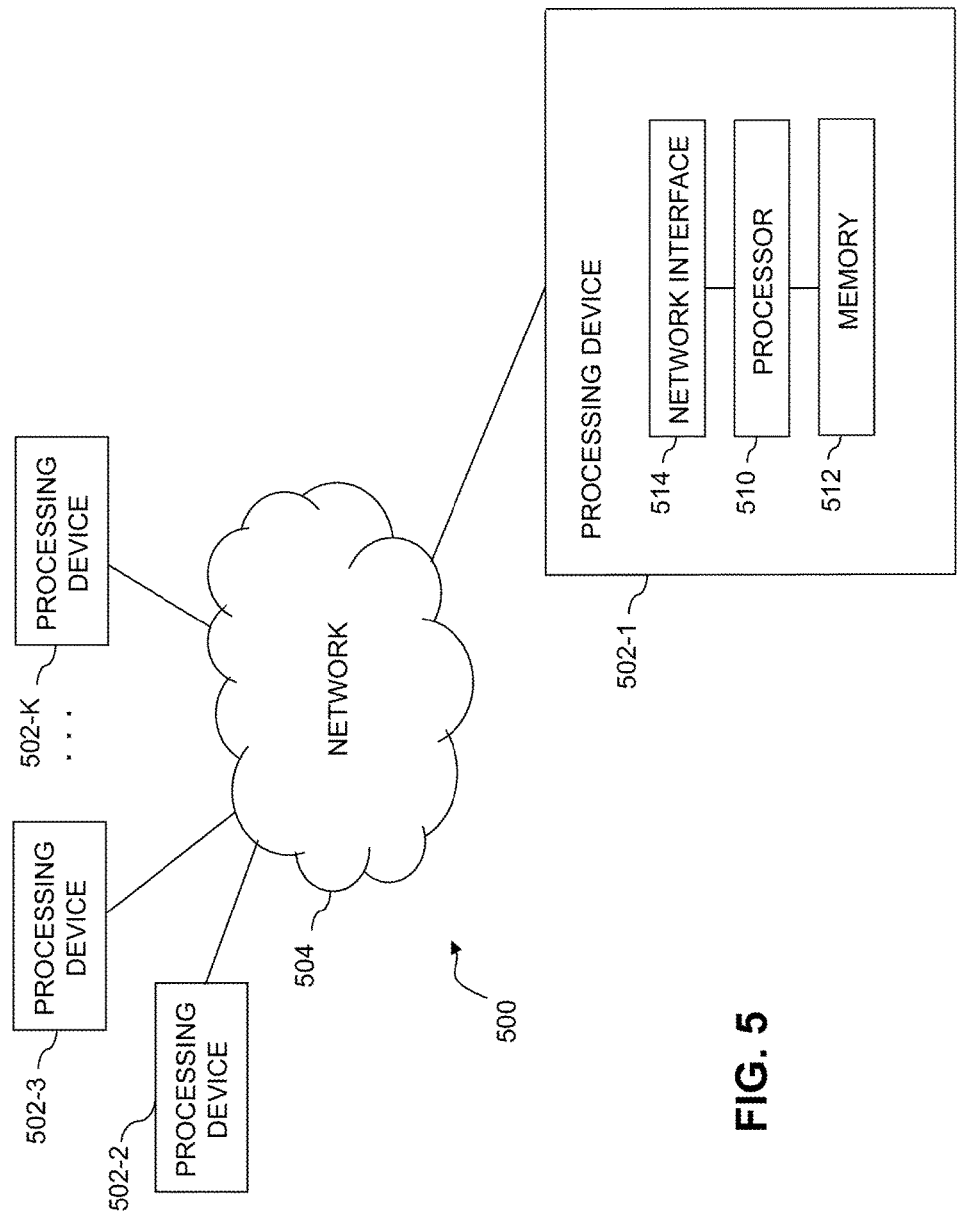

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises virtual machines (VMs) 402-1, 402-2, ... 402-L implemented using a hypervisor 404. The hypervisor 404 runs on physical infrastructure 405. The cloud infrastructure 400 further comprises sets of applications 410-1, 410-2, ... 410-L running on respective ones of the virtual machines 402-1, 402-2, ... 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 404 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, ... 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of copy data manager 110, application manager 114 and automated code testing system 120 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute services platforms, copy data managers, application managers, data version and code version repositories, development platforms and automated testing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices and implementing compute services for users;
at least one of the processing devices comprising a physical processor coupled to a memory;
said at least one processing platform further comprising:
a copy data manager configured to maintain a data version repository;
wherein the data version repository is configured to store under the control of the copy data manager a plurality of data versions for each of one or more of the compute services implemented by the processing platform;
wherein a code version repository is configured to store a plurality of code versions for each of one or more of the compute services implemented by the processing platform;
the code versions stored in the code version repository and the data versions stored in the data version repository collectively providing a two-dimensional test plane;
the two-dimensional test plane comprising a first axis corresponding to the code versions and a second axis corresponding to the data versions, a given point in the two-dimensional test plane corresponding to a particular one of the code versions and a particular one of the data versions;
wherein automated testing of at least one of the code versions is carried out by an automated code testing system using multiple distinct ones of the data versions selected from the two-dimensional test plane; and
wherein the automated testing comprises traversing a path through at least a portion of the two-dimensional test plane and for each of a plurality of points in the path testing a corresponding one of the code versions utilizing a corresponding one of the data versions.

2. The apparatus of claim 1 wherein said at least one processing platform comprises at least a first processing platform implementing the compute services and the copy data manager and at least a second processing platform separate from the first processing platform and implementing the automated code testing system.

3. The apparatus of claim 1 wherein the copy data manager is configured to control storage of at least a subset of the data versions for a given one of the compute services in the data version repository as respective point-in-time backup or replication copies of application data utilized by that compute service.

4. The apparatus of claim 1 wherein the copy data manager is configured to control storage of at least a subset of the data versions for a given one of the compute services in the data version repository as respective instances of live application data utilized by that compute service.

5. The apparatus of claim 1 wherein one or more of the data versions comprise respective metacopies of data utilized by a corresponding one of the compute services.

6. The apparatus of claim 1 wherein the code version repository comprises a code version control repository associated with a code development system.

7. The apparatus of claim 1 wherein the path comprises a plurality of points for testing a single one of the code versions using respective multiple ones of the data versions.

8. The apparatus of claim 1 wherein the path comprises a plurality of points for testing respective multiple ones of the code versions using a single one of the data versions.

9. The apparatus of claim 1 wherein the path comprises a plurality of test points for testing respective multiple ones of the code versions using respective multiple ones of the data versions.

10. The apparatus of claim 1 wherein the automated testing system implements an automated quality assurance software bot that selects the points of the path through at least a portion of the two-dimensional test plane.

11. The apparatus of claim 1 wherein the automated testing system is configured to select at least a subset of the plurality of points utilizing at least one of random selection, arbitrary selection, round-robin selection, revenue-based selection and issue-based selection.

12. The apparatus of claim 1 wherein the copy data manager is configured to transfer the data versions selected from the two-dimensional test plane from the data version repository to the automated testing system.

13. The apparatus of claim 1 wherein the automated testing system is configured to retrieve the code versions from the code version repository.

14. A method comprising:
implementing compute services for users;
storing a plurality of data versions for each of one or more of the compute services;
storing a plurality of code versions for each of one or more of the compute services; and
automatically testing at least one of the code versions using multiple distinct ones of the data versions selected from a two-dimensional test plane collectively provided by the plurality of code versions and the plurality of data versions;
the two-dimensional test plane comprising a first axis corresponding to the code versions and a second axis corresponding to the data versions, a given point in the two-dimensional test plane corresponding to a particular one of the code versions and a particular one of the data versions;
wherein automatically testing comprises:
traversing a path through at least a portion of the two-dimensional test plane; and
for each of a plurality of points in the path testing a corresponding one of the code versions utilizing a corresponding one of the data versions;
wherein the method is performed by at least one processing platform comprising a plurality of processing devices.

15. The method of claim 14 wherein one or more of the data versions for a given one of the compute services comprise respective point-in-time backup or replication copies of application data utilized by that compute service and further wherein one or more other ones of the data versions for the given compute service comprise respective instances of live application data utilized by that compute service.

16. The method of claim 14 wherein the path comprises a plurality of test points for testing respective multiple ones of the code versions using respective multiple ones of the data versions.

17. The method of claim 14 wherein automatically testing comprises deploying an automated quality assurance software bot to select the points of the path through at least a portion of the two-dimensional test plane.

18. A computer program product comprising a non-transitory processor-readable storage medium having stored therein program code of one or more software programs, wherein the program code when executed by at least one processing platform causes said at least one processing platform:

to implement compute services for users;
to store a plurality of data versions for each of one or more of the compute services;
to store a plurality of code versions for each of one or more of the compute services; and
to automatically test at least one of the code versions using multiple distinct ones of the data versions selected from a two-dimensional test plane collectively provided by the plurality of code versions and the plurality of data versions;
the two-dimensional test plane comprising a first axis corresponding to the code versions and a second axis corresponding to the data versions, a given point in the two-dimensional test plane corresponding to a particular one of the code versions and a particular one of the data versions;
wherein automatically testing comprises traversing a path through at least a portion of the two-dimensional test plane and for each of a plurality of points in the path testing a corresponding one of the code versions utilizing a corresponding one of the data versions.

19. The computer program product of claim 18 wherein one or more of the data versions for a given one of the compute services comprise respective point-in-time backup or replication copies of application data utilized by that compute service and further wherein one or more other ones of the data versions for the given compute service comprise respective instances of live application data utilized by that compute service.

20. The computer program product of claim 18 wherein automatically testing comprises deploying an automated quality assurance software bot to select the points of the path through at least a portion of the two-dimensional test plane.

* * * * *